Patented Nov. 6, 1928.

1,690,627

UNITED STATES PATENT OFFICE.

CARLETON ELLIS AND VERNON T. STEWART, OF MONTCLAIR, NEW JERSEY, ASSIGNORS TO CHADELOID CHEMICAL COMPANY, OF NEW YORK, N. Y., A CORPORATION OF WEST VIRGINIA.

PROCESS OF MAKING ARSENATE OF LIME.

No Drawing.   Application filed March 5, 1923.  Serial No. 623,010.

This invention relates to a process of making arsenicals useful as insecticides and will be illustrated in a specific manner by a method of making calcium arsenate.

The object of the present invention is to eliminate the costly and troublesome method of making calcium arsenate commonly known as "arsenate of lime" by the precipitation method according to which the arsenical is produced by reactions taking place in a large volume of water resulting in a precipitate of the arsenate of lime.

In the present invention an object is to carry out the reaction under substantially anhydrous conditions or under conditions which do not involve the presence of a great bulk of water. In fact under preferred conditions no greater amount of water need be present than that capable of combining with or distributing through the resultant product without affecting its pulverulent condition in an objectionable manner.

Arsenate of lime for use as an insecticide is required to be in a pulverulent form which enables its distribution over foliage in an economical manner. According to the present invention a bulky powder may be obtained which may be used advantageously for example in the control of the boll weevil.

Several different modifications or types of procedure to make the product of the present invention will now be described.

1. The process of preparation may be carried out in one stage by reaction between the lime material and arsenic acid in a dry state.

(a) Ordinary lump quick lime may be ground in a ball mill with the requisite amount of substantially dry arsenic acid.

(b) Or a mixture of quick lime and hydrated lime may be employed in this grinding operation.

(c) Quick lime may be partially slaked so that one-fourth to three-fourths of the lime is hydrated and this material ground or well mixed with substantially dry arsenic acid to bring about reaction.

(d) Or the reaction may be carried out between quick lime and substantially dry arsenic acid by grinding together and adding small quantities of water from time to time in order to assist in the reaction, the resultant product being a dry powder.

The proportions of lime and arsenic acid will be more fully discussed later. If the grinding is carried out for example in a ball mill external heat may be applied if desired. Or the heat of reaction of a mass of the material in an advanced stage of conversion may be employed to supply heat to the reacting mixture in an earlier stage of conversion.

Also an aqueous solution of arsenic acid containing only a comparatively small amount of water may be ground in a ball mill with quick lime, partially hydrated lime or mixtures of quick lime and hydrated lime. The quick lime may be in the lump form or crushed to a coarse powder or finely ground. The hydrated lime is preferably in a finely powdered state.

2. One stage process, involving the use of aqueous solutions of arsenic acid.

(a) Partially hydrated lime in a pulverulent state may be treated with an aqueous solution of arsenic acid by adding the latter gradually to the lime powder and stirring vigorously.

(b) A mixture of crushed quick lime and powdered hydrated lime may be similarly treated.

(c) A mixture of quick lime and hydrated lime is treated with solution of arsenic acid containing enough water to produce a putty or damp coherent mass may be obtained and this product dried by the application of heat.

(d) Or the damp composition obtained according to (c) may be air-dried and then ground and subjected to air-separation to obtain a voluminous powder.

Two stage process.—A desirable method of carrying out the reaction is that of slaking crushed quick lime with an aqueous solution of arsenic acid containing water adequate to produce a putty and subsequently drying or desiccating the putty by the addition of further quantities of crushed or ground quick lime.

The following serve to illustrate the manner in which the product may be prepared under the different modifications mentioned.

1 (a). Use 50 parts by weight of quick lime to 40 parts of substantially dry arsenic pentoxide. The mixture is placed in a ball mill kept in motion until tests show the reaction has progressed to the point desired.

The corresponding amount of arsenic acid may be used in place of the pentoxide.

1 (b). Use 75 parts by weight of hydrated lime to 40 parts of arsenic pentoxide.

1 (c). Use 50 parts by weight of quick lime to 40 parts of substantially dry arsenic pentoxide. About 10 parts by weight of water may be added.

2 (a). 50 parts by weight of quick lime crushed to a coarse powder are treated with 10 parts of water. The latter is added gradually with stirring. While still hot 55 parts of a 90 per cent solution of arsenic acid are added gradually with stirring.

2 (b). A mixture of powdered quick lime 25 parts and hydrated lime 33 parts is treated with arsenic acid solution, for example a 75 per cent or 90 per cent solution as set forth in 2 (a).

*Two stage modification.*—32 parts of crushed quick lime are treated with 70 parts of an aqueous arsenic acid solution of 75 per cent strength. The moist material is treated with 18 parts by weight of powdered quick lime to dry and produce a pulverulent product. The quick lime when so added, unites with the water, forming slaked lime, in a powdery state.

In like manner arsenic acid of 80, 85 and 90 per cent strength may be used calling for a greater or lesser amount of quick lime in the drying operation.

The method of treatment in two stages has the advantage that the arsenic acid reacts with quick lime in the presence of sufficient moisture to allow complete reaction to take place. A sufficient amount of lime preferably is present during the first stage of the operation to combine completely with the entire amount of arsenic acid. Enough quick lime is then added to bring about desiccation.

In general (as explained in copending application, Serial No. 523,938, (now Patent 1,447,938) containing matter disclosed in an earlier case Ser. No. 431,348 (now Patent 1,447,937) of which the present application constitutes a continuation in part) it is desirable to use the lime in a finely divided state. The addition of arsenic acid solution to lumps of lime does not allow slacking and reaction to take place effectively. The exterior of the lump is coated with arsenic compound and the layer varies in composition from exterior to interior. Compounds having an injurious action on vegetation thus may be produced. By crushing the lime to a powder or to a product the particles of which are not coarser than grains of wheat serves to yield a product which is completely converted into arsenate of lime of the form desired as an insecticide for boll weevil control. Preferably the lime is ground to a powder which will pass 80 mesh screen. The formation of mono- and di-calcium arsenates whose final neutralization is difficult is thereby very largely avoided. The arsenic content of the product has to be within certain limits ordinarily 40 per cent of arsenic pentoxide in combined form being permissible. Soluble arsenic should not exceed ¾ of 1 per cent expressed as arsenic pentoxide. The addition of arsenic acid solutions to powdered quick lime and especially the high calcium lime preferably employed in making the product of the present invention produces a chemical reaction which is usually very violent and the vigorous stirring which is preferably employed in mixing gives rise to a great deal of dust. It is desirable to have the agitator covered tightly to avoid loss of the constituents and thereby cause a modification in proportions which would be undesirable. The air flotation of the product to separate the fine from the coarse material serves to obtain a bulky product which is desirable.

In general we prefer to have present a small amount of quick lime rather than to have all the free lime in a slaked condition and possibly containing some moisture. The action of moisture over a long period appears to cause a breaking down of arsenate of lime with the formation of soluble products. By carrying out the reaction so as to have in the final product a small amount of quick lime, even though this be only 1 or 2 per cent is considered to be beneficial. It is our opinion that moisture acts catalytically in causing the decomposition of arsenate of lime.

What we claim is:

1. The process of making arsenate of lime which comprises reacting on powdered quick lime with a solution of arsenic acid containing water in excess of that required to completely hydrate the lime and thereafter desiccating the product by the addition of pulverized quick lime.

2. A process which comprises adding to an alkaline pulverulent material containing a substantial amount of quick lime, a concentrated solution of arsenic acid containing enough water to produce a somewhat moist product and thereafter mixing such product with an amount of quick lime sufficient to combine with a very substantial part at least, of the water present therein, to form a substantially dry pulverulent product.

3. A process which comprises successively adding to substantially dry finely divided lime material, successive amounts of strong arsenic acid, and agitating continuously until the chemical reaction is substantially complete, and thereafter mixing the product with a small amount of quick lime to dry the product and leave it in a fine pulverulent condition.

CARLETON ELLIS.
VERNON T. STEWART.